United States Patent [19]
Saldick

[11] 3,926,795
[45] Dec. 16, 1975

[54] BIOLOGICAL TREATMENT OF PLANT WASTE STREAMS TO REMOVE CYANURIC ACID

[75] Inventor: Jerome Saldick, Princeton, N.J.

[73] Assignee: FMC Corporation, Philadelphia, Pa.

[22] Filed: May 23, 1974

[21] Appl. No.: 472,836

[52] U.S. Cl. .................. 210/11; 210/12; 210/16
[51] Int. Cl. ............................................. C02c 5/10
[58] Field of Search .............. 210/4, 5, 7, 9, 11, 12, 210/16, 15, 18, 62, 2; 260/248 C, 248 A

[56] References Cited
UNITED STATES PATENTS 3,654,147   4/1972   Levin et al. ......................... 210/16

OTHER PUBLICATIONS

Jensen H. L. and Abdel–Ghaffar, *Arch. Mikrobiol.*, 67, 1 (1969).

*Primary Examiner*—Thomas G. Wyse
*Assistant Examiner*—Benoit Castel

[57] ABSTRACT

Cyanuric acid is removed from aqueous chemical plant wastes containing it by treatment of the wastes with active bacteria derived from sewage or soils while maintaining relatively anaerobic conditions, supplying nutrients to the system, while preferably holding the pH fairly close to the neutral point (about 5.0 to 8.5) and the temperature close to ambient.

2 Claims, 1 Drawing Figure

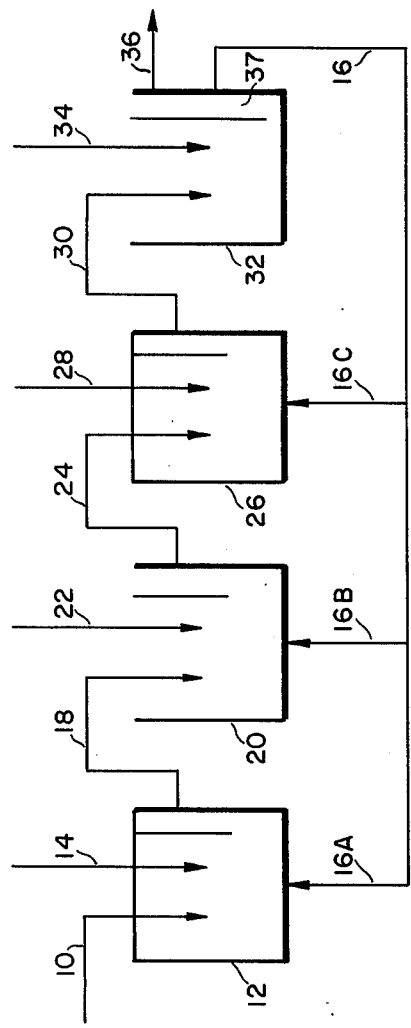

BIOLOGICAL TREATMENT OF PLANT WASTE STREAMS TO REMOVE CYANURIC ACID

This invention relates to the treatment of waste liquors containing cyanuric acid, for the purpose of decomposing the cyanuric acid present therein.

Cyanuric acid (either free or in salt form) is present in the waste liquors from processes which manufacture it, and those which convert it into di- and trichlorinated derivatives, now widely used as a source of active chlorine in various household detergents and in swimming pools. The discharge of such wastes is expected to be prohibited by pending governmental regulations, and the question arose as to whether it is possible to remove cyanuric acid from such waste liquors in a reasonable length of time by biological means, or whether it is necessary to go to expensive chemical treatment, or to even more expensive evaporation and incineration. The literature indicated that rapid biological removal was unpromising.

Cyanuric acid is not biodegradable in standard screening tests, such as are reported in: Bunch, R. L., and Chambers, C. W., *J. Water Pollution Control Fed.*, 39, 181(1967); Ludzack, F. J., and Ettinger, M. B., *Proceedings of the 18th Industrial Waste Conference*, Purdue University, Eng. Ext. Ser., 115, 278-282(1963); Thompson, J. E., and Duthie, J. R., *J. Water Pollution Control Fed.*, 40, 306(1968); Sturm, R. N., *J. Am. Oil Chemists Society*, 50, 159–167 (1973). All of these tests are operated with low biomass concentration and high oxygen.

However, Hauck and Stephenson, *J. Agr. and Food Chem.*, 12, 147–151(1964), showed that the nitrogen in cyanuric acid appears as nitrate in soil after a period of 12 to 18 weeks when cyanuric acid is applied to soil, somewhat more rapidly when the soil is kept in a bottle than when it is kept open. This report suggests that cyanuric acid can be biodegraded over a prolonged period of time. Jensen and Abdel-Ghaffar, *Arch. Mikrobiol.*, 67, 1(1969), showed that certain molds could live on the nitrogen obtained from cyanuric acid. These molds fluorished under acid conditions. Bacteria which apparently utilized cyanuric acid were discovered, but the investigators were not able to maintain the cultures. McCormick and Hiltbold, *Weeds*, 14, 77(1966), recognized that atrazine (a triazine-based herbicide) was biodegradable in soil and that added glucose favored the biodegradability.

All of this indicated that, at best, the biodegradation approach to the disposal problem could involve long holding periods. The prognosis was further adversely affected by the presence in the process waste liquors of chlorides and sulfates, which generally slow up biological processes.

I have discovered that, despite the adverse indications in the literature, cyanuric acid, present along with chlorides and sulfates in aqueous effluents from cyanuric acid and chlorinated cyanuric acid processes, can indeed be rapidly and inexpensively broken down by hydrolysis into $CO_2$ and ammonia by treatment with bacteria derived from raw sewage, activated sludges from sewage plants, natural waters or soils, at temperatures below 50°C, provided that anaerobic or close to anaerobic conditions prevail in at least a portion of the biomass in the system, nutrient for the bacteria is fed to the system, and the system is maintained at a pH close to neutral (about 5.0 to 8.5).

After breakdown of the cyanuric acid to $CO_2$ and ammonia, the system can, if desired to dispose of the ammonia, be nitrified with air in known manner, biologically denitrified in known manner, then oxidized with air to remove its residual biological oxygen demand, clarified and discharged. The sludge from the system can then be used as source of bacteria in the primary hydrolysis.

The drawing is a flow sheet of the complete process.

As indicated above, di- and trichloroisocyanuric acid and alkali metal salts of dichloroisocyanuric acid have come into extensive use as sources of active chlorine in household detergents and in swimming pools. The processes for manufacture of these products produce aqueous effluents containing of the order of 500 to 2,000 ppm (parts per million) of cyanuric acid, typically along with a few percent of alkali metal chloride and sulfate. The alkali metal salts are in low enough concentration so their disposal is rather easy, but the cyanuric acid should be essentially removed before discharge, to satisfy effluent regulations.

I have found that the bacteria present in raw sewage, activated sewage sludge, natural waters, and in most soils, will in fact attack cyanuric acid under anaerobic or near anaerobic conditions, hydrolyzing it to $CO_2$ and ammonia, and that the attack will be sufficiently rapid to be the basis for an economic waste disposal system, if conditions are properly maintained, as indicated in the statement of the invention and as further specified below.

The bacteria used in the process are the common bacteria present in natural waters, in soils, in sewage and in activated sludges from sewage plants. I have isolated individual strains of several of these bacteria and have not been successful in producing the hydrolysis, so I do not know which of the bacteria present do the job; the mixture, or an individual strain I have not isolated, does work.

The process involved apparently takes place in the biomass, either in the cells or immediately adjacent thereto. Absence of air in at least a portion of the biomass appears essential; aerobic conditions in some of the medium do not prevent biodegradation because the oxygen present in such cases does not penetrate the biomass, permitting anaerobic conditions to prevail in the biomass itself. Substantial hydrolysis rates are achieved even when the oxygen dissolved in fluid surrounding clumps of biomass is as high as 4–5 mg/liter. However, in plant processing of effluent, I prefer to operate without adding any air to the fluid surrounding the biomass, to minimize the use of nutrients; it is not necessary to de-aerate any of the entering materials.

The cyanuric acid does not seem to provide any nutrient to the biomass; tests with radioactive ($^{14}C$ tracer) cyanuric acid show that all of the carbon goes to $CO_2$, and other tests show that all of the nitrogen goes to $NH_3$. Hence, it is necessary, for optimum results, to add carbonaceous nutrients to the biomass. This may be done by using raw sewage, or by using cheap sources of carbonaceous nutrients, e.g. a carbohydrate, such as molasses. In tests run for the purpose, it was noted that unfed biomass will continue activity for a few days before results are significantly lower, but that feeding is essential within a week, and is preferably done at least daily, most preferably continuously.

Since the operation is biological, conditions must favor the growth of the biomass. Near neutral pH is employed — a range of about 5.0 to 8.5 is indicated.

Similarly, the temperatures are preferably in the 20° to 30°C range; lower temperatures can be used, provided they are above the freezing point, but slow the reaction up somewhat (at 5°C, the reaction goes at about half the rate obtained at both 20° and 30°C), while temperatures above about 50°C destroy the bacteria. Typically, I use the waste streams at their effluent temperatures (about 15° to 35°C), since this is most economical, involving no expense for heating or cooling.

Cyanuric acid seems to be unique among organic compounds in not being biodegradable under aerobic conditions, but being rapidly biodegradable under anaerobic conditions.

The $CO_2$ produced by the biologically induced hydrolysis can be vented to the air. The $NH_3$ produced may, if desired, be oxidized to nitrate, in known manner, by treatment with air, and the nitrate removed by standard biological treatment.

The complete scheme is shown in the drawing.

A stream of plant waste 10 is fed into a hydrolysis vessel 12, to which is fed activated sludge from line 16A along with bionutrient from line 14. The vessel 12 may be of any convenient design; my pilot work has been in a column packed with Raschig rings or Berl saddles. The waste is maintained in contact with the active biomass long enough to complete the hydrolysis; about 12 to 24 hours seem indicated.

The effluent from vessel 12 goes through line 18 into another vessel 20, fed with biomass from line 16B and air from line 22. This is a standard process for sewage treatment, requiring about 24 hours, to convert the ammonia to nitrates.

The effluent from vessel 20 enters vessel 6 through line 24; biomass from line 16C and bionutrient from line 28 act on the nitrates to reduce them to nitrogen, again in known manner. This denitrifying reaction takes about 4 hours.

The effluent from vessel 26 passes through line 30 into an aerating unit 32 containing a clarifier 37 where the mixed liquor is activated with air from line 34, and clarified in section 37. Clarified purified liquid is discharged to waste through line 36, and the activated sludge is recycled into line 16 to feed vessels 12, 20 and 26.

The following examples are given by way of illustration, and should not be deemed limiting of the invention.

EXAMPLE 1

This example shows that the cyanuric acid degrading capability of a given biomass can be greatly increased by making the system anaerobic and greatly reduced by making it highly aerobic.

A 1.5-liter automated draw-fill activated sludge unit was operated in the laboratory on the following 8-hour total cycle: a 7-hour period for stirred aeration, a 55-minute settling period, a 2-minute period for drawing off the upper two-thirds of the volume, and a 3-minute period for refilling with refrigerated raw sewage, after which a new aeration cycle was begun. The sewage reservoir was refilled manually every 4 to 6 days.

Cyanuric acid was assayed gravimetrically as the melamine-cyanuric acid complex by adding 200 ml (a large excess) of an aqueous solution of melamine (2 g/liter) to 200 ml of prefiltered test solution preadjusted to a pH of 4.4 ± 0.3.

With ≈ 10 mg/liter of cyanuric acid added to the fresh raw sewage feed, the following results were obtained (using gravimetric analysis):

a. after several days of normal operation with aeration:

| | |
|---|---|
| feed: | 9.6 mg/liter cyanuric acid |
| effluent: | 8.3 mg/liter cyanuric acid | b. continuing operation with the same feed, 16 hours after the incoming gas was changed from air to nitrogen:

| | |
|---|---|
| feed: | 7.7 mg/liter cyanuric acid |
| effluent: | <1 mg/liter cyanuric acid |

In a repeat experiment, using a new batch of feed, but with the same biomass in the unit:

a. after 24 hours of normal (air) operation:

| | |
|---|---|
| feed: | 10.5 mg/liter cyanuric acid |
| effluent: | 7.4 mg/liter cyanuric acid | b. continuing operation with the same batch of feed 16 hours after the incoming gas was changed from air to nitrogen:

| | |
|---|---|
| feed: | 9.4 mg/liter cyanuric acid |
| effluent: | <1 mg/liter cyanuric acid | c. further continuing with the same batch of feed, and using air for 3 days after the previous sampling:

| | |
|---|---|
| feed: | 6.8 mg/liter cyanuric acid |
| effluent: | 6.7 mg/liter cyanuric acid |

EXAMPLE 2

This example shows that cyanuric acid biodegrades in anaerobic sewage.

Primary settled domestic sewage, containing 10 mg/liter of cyanuric acid, was allowed to become anaerobic or intentionally made anaerobic. The cyanuric acid concentration was reduced by 25–50% in 48 hours, and complete disappearance of the cyanuric acid was observed within 72–96 hours.

EXAMPLE 3

This example shows that the removal of cyanuric acid is truly a decomposition and that the carbon of cyanuric acid is evolved as carbon dioxide.

Cyanuric chloride - $^{14}C$ was hydrolyzed to the acid at pH 4 (~90°C; 2 hours) at such concentration to give a final solution of ~1 microcurie/ml, and the solution was then brought to pH 6. The purity was checked as discussed in the following paragraph and found to be >99%.

Five milliliters of cyanuric acid - $^{14}C$ solution was added to a solution of ordinary cyanuric acid (20 mg) in 10 ml of water adjusted to pH 4.3. Then 20 ml of melamine solution (2 g/liter) was added. After centrifugation, the clear supernatant liquid was assayed for $^{14}C$ content, and the nonprecipitated $^{14}C$ was taken as a measure of the upper limit of radiochemical impurity.

In a first experiment cyanuric acid - $^{14}C$ tracer solution (1 ml) was added to 1 liter of mixed liquor from a laboratory unit, containing about 2 g of activated sludge, starved by overnight aeration without any feed, and nitrogen was bubbled through the stirred suspension at a rate of 1 liter/hour. The $^{14}C$ was evolved as $^{14}CO_2$ as follows: 4% within 7 hours, 11% (total) in the next 17 hours, and 82% (total) in 17 days. In a second, repeat experiment, the $^{14}CO_2$ evolution was as follows: 50% in 8 days, 71% in 13 days; in a third repeat, the $^{14}CO_2$ evolution was 93% in 6 hours. Mixed liquor activity was clearly very variable.

Residue from the above first experiment was dissolved completely in an equal volume of concentrated sulfuric acid containing 15 g of $K_2Cr_2O_7$, and boiled for 2 hours (as called for in Standard Methods for the Examination of Water and Wastewater, 13th Edition, 1971, American Public Health Association, New York, pp. 495–499) while a gentle current of air was passed through the system and then through a trap containing 0.5N sodium hydroxide. The evolved $CO_2$ from this residue solution contained 1.3% of the $^{14}C$ initially added. In a control oxidation experiment, cyanuric acid - $^{14}C$ evolved about half of its $^{14}C$ as $CO_2$ within 2 hours under similar conditions. Thus, essentially no $^{14}C$ from cyanuric acid was synthesized into biomass.

EXAMPLE 4

This example shows that the biodegradation of cyanuric acid takes place in conventional bacterial nutrient broth as well as in activated sludge. It also shows that cyanuric acid is degraded by a process which gives an initial rate which is less than first order in cyanuric acid.

Nutrient broth (Difco) was inoculated with mixed inoculum from a sewage plant effluent and incubated aerobically for 48 hours at 23°C. A small amount of flocculent biomass was removed by filtration through coarse filter paper. Cyanuric acid - $^{14}C$ (0.8 ml; 0.8 microcuries) was added to 250 ml of this culture in a 500-ml flask, and nitrogen was bubbled through for 48 hours. The $^{14}CO_2$ in the effluent gases contained 80% of the radioactivity initially added. A similar experiment to which 10 mg of cyanuric acid (40 mg/liter) was added at the start of the anaerobic period gave the following results;

| $^{14}CO_2$ yield | | time, hours |
|---|---|---|
| no added cyanuric acid | 40 mg/liter added cyanuric acid | |
| 0.49% | 0.11% | 1.5 |
| 1.20% | 0.47% | 3.0 |
| 25.0% | 4.10% | 24.0 |
| 95.0% | 98.0% | 72.0 |

EXAMPLE 5

In this example, it is shown that cyanuric acid degrades on soils and muds.

The experiments with soils were done by adding 1 ml of cyanuric acid - $^{14}C$ solution (1 $\mu$Ci/ml) to 20 g of slightly moist soil in a stoppered 250 ml Erlenmeyer flask in which an open vial containing 3 ml of 1N NaOH solution was suspended by a wire hook. After an appropriate time of quiet standing at 23°C, the contents of the vial were assayed for $^{14}C$. Data from experiments with soils, muds and natural waters are given in Table I. The >100% yields listed are 100% within the experimental error of the method.

Model experiments with soils in the absence of added cyanuric acid showed that the $O_2$ concentration in the atmosphere inside the flask decreased by 10–20% in a 3-week period, indicative of the general level of biological activity in the soil. The experiments with lake water were stirred occasionally. (See Table I.)

Table I $^{14}CO_2$ Evolution from $^{14}C$-Cyanuric Acid on Soils, Muds, and in Streams and Lakes

| | Medium and Source | Days at Room Temperature | % of $^{14}C$ Added Evolved as $^{14}CO_2$ |
|---|---|---|---|
| 1. | Soil From Santa Clara, Cal. | 23 | 91 |
| 2. | Soil from S. Charleston, W. Va. | 23 | 106 |
| 3. | Soil from Princeton, N.J. | 23 | 103 |
| 4. | Mud from bottom of Belcher Creek (near Greenwood Lake, N.J.): Run No. | | |
| | 1) Undiluted mud | 23 | 105 |
| | 2) Undiluted mud | 23 | 116 |
| | 3) Suspension of mud (1%) in deionized water | 8 | 1.1 |
| 5. | Soil from long-used barnyard, New Brunswick, N.J. Run No. | | |
| | 1) Undiluted soil | 23 | 2.2 |
| | 2) Undiluted soil | 23 | 10.4 |
| | 3) Undiluted soil | 23 | 13.5 |
| | 4) Suspension of soil (~50%) in deionized water | 15 | 52 |
| 6. | Lake Carnegie, Princeton, N.J. | | |
| | 1) Lake water | 29 | 5.1 |
| | 2) Lake water with 5% bottom mud added (Continuation of Run No. 1) | 37 (cumulative) | 33 (cumulative) |
| | 3) Continuation of Run No. 2 | 52 (cumulative) | 46 (cumulative) |

EXAMPLE 6

Muds were obtained from a low-salinity (~8% NaCl) brine pond and a moderate salinity (~16% NaCl) brine pond at the Leslie Salt Company plant in Newark, Calif., from lower San Francisco Bay, off the Southern Pacific Railroad bridge, and from Arthur Kill, an arm of the Atlantic Ocean, at Carteret, N.J. These muds were used as a source of biomass for the process; all muds were highly active.

EXAMPLE 7

This example shows that in an activated sludge system, the biodegradation of cyanuric acid takes place reasonably well when the dissolved-oxygen concentration in the supernatant liquid is less than 5 mg/liter. At the same time, provided the dissolved oxygen is greater than 1.5–3.0 mg/liter, the $BOD_5$ is effectively reduced.

The results in Table II were obtained using a completely stirred, Eckenfelder-Ford (Eckenfelder, W. W., and Ford, D. L., "Water Pollution Control", Jenkins Book Publishing Co., Austin and New York, 1970, p. 133) laboratory unit, fed with domestic sewage to which 10 mg/liter cyanuric acid had been added. The low DO values were obtained by reducing the air flow; mechanical stirring was used to agitate the mixed liquor.

Table II

Biodegradation of Cyanuric Acid
By Aerated Activated Sludge

| Dissolved Oxygen (mg/liter) | Residence Time (hours) | $BOD_5$ in Effluent | Cyanuric Acid Degraded (%) |
|---|---|---|---|
| 1.0 | 6.5 | 46 | 89 |
| 1.5 | 6.0 | 75 | 79 |
| 2.2 | 5.5 | 22 | 62 |
| 2.5 | 8 | 78 | 100 |
| 3.0 | 10 | 6 | 84 |
| 5.0 | 5.5 | 6 | 51 |
| 5.7 | 14 | 12 | 15 |
| 7 | 6.5 | — | 23 |
| 8.7 | 5 | — | 14 |
| 8.7 | 9 | — | 42 |
| 9.0 | 14 | 12 | 65 |

EXAMPLE 8

This example shows that the biodegradation proceeds in the presence of sodium chloride.

To test the biodegradability of cyanuric acid in sea water and saline plant wastes, saline (2% NaCl) mixed liquor containing activated sludge to which 20 mg/liter cyanuric acid had been added was made anaerobic by bubbling with nitrogen for 19 hours. Tracer cyanuric acid - $^{14}C$ was then added and the nitrogen flow continued for an additional 28 hours during which the $^{14}CO_2$ was scrubbed out, and then assayed. The yield of $^{14}CO_2$ was 25.1% of the $^{14}C$ added. A similar experiment was performed at 3.5% NaCl concentration. In 5 days, 64.3% of the $^{14}C$ was evolved as $^{14}CO_2$.

A mixed inoculum taken from local soil was cultured anaerobically for 7 days in 5% saline nutrient broth; similar broth was inoculated from this culture and kept aerated for 4 days. Tracer cyanuric acid - $^{14}C$ was added and the system kept anaerobic by bubbling nitrogen for 5 days. The $^{14}CO_2$ was absorbed and assayed. The $^{14}CO_2$ yield was 9.4%.

EXAMPLE 9

In this example, the biodegradation of cyanuric acid during continuous processing through a column containing a mixed biomass is demonstrated.

A 4-inch diameter by 4-foot long glass column packed with ½-inch Berl saddles was operated with upward flow of deaerated feed solutions. All feed solutions contained 0.1% of cyanuric acid.

The free volume in this column was 5 liters. The column was operated for 10–12 days in order to build up biomass on the column packing and to come approximately to steady state. Operation was at 23±2°C. With undiluted raw sewage as feed, with raw sewage diluted 1:1 with tap water as feed, and with sewage diluted 1:9 with tap water as feed, complete removal of cyanuric acid was achieved with residence times of ~10 hours or greater.

EXAMPLE 10

A column similar to the one described in Example 9 was operated using as feed a solution containing 0.1% of cyanuric acid, 2% of sodium chloride and 0.5% of sodium sulfate in a 1:1 mixture of raw sewage and water. Complete removal of cyanuric acid was achieved when the residence time of the solution in the column was at least 15 hours.

EXAMPLE 11

A column similar to that described in Examples 9 and 10 was operated with a feed containing 1.5% of sodium sulfate plus 1.0% of sodium chloride and 0.1% of cyanuric acid in a 1:1 sewage:tap water mixture. Results were the same as in Example 10.

EXAMPLE 12

A column similar to that described in Example 9 was operated with a feed containing 0.1% of cyanuric acid, 3% of sodium sulfate plus 2% of sodium chloride in a 1:1 sewage:tap water solution. About 70% removal of cyanuric acid was obtained with a residence time of ~65 hours.

EXAMPLE 13

The columns described in Examples 9, 10, 11 and 12 were operated using feeds containing 0.1% of cyanuric acid and salt concentrations as listed, but with artificial nutrient in the feed instead of raw sewage. Columns were first operated with sewage in the feed to build up biomass. Then 30 mg/liter of glucose, sucrose, corn syrup, and molasses were respectively substituted for the nutrient in the sewage. The columns continued to operate as they had when there was sewage in the feed. Cyanuric acid continued to be effectively removed.

The columns operated with molasses were run at 5°, 10°, 15°, 20°, 25° and 30°C. The rate at 5°C was only half that at 20°C, which in turn was essentially the same rate as that obtained at 25° and 30°C.

EXAMPLE 14

Following an extended period of operation with feed solutions containing sewage and carbohydrate as nutrients as described above, the four columns were operated with feed consisting of cyanuric acid alone in tap water. Degradation of cyanuric acid continued at high rates for several days and then gradually decreased, although ~50% removal of cyanuric acid took place after 2 weeks on the nutrient-free feed.

No examples of the operation of the nitrifying, denitrifying and clarification steps have been given, since these are standard operations used for treatment of wastes containing ammonia.

Obviously, the examples can be multiplied indefinitely, without departing from the scope of the invention as defined in the claims.

The term "cyanuric acid" as used in the specification and claims refers to the free acid and its salts; at a pH of 7.0 or higher, the cyanuric acid is bound up as a salt.

What is claimed is:

1. The method of rapidly decomposing cyanuric acid contained in an aqueous mixture which comprises holding the aqueous mixture at a pH of about 5.0 to 8.5 in contact with an active biomass containing bacteria derived from natural water, sewage or soil, at least a portion of which biomass is under anaerobic conditions, for a time sufficient to hydrolyze the cyanuric acid to $CO_2$ and ammonia, maintaining enough nutrient in the mass to feed the bacteria, while maintaining the mass at a temperature above freezing and below 50°C.

2. The method of claim 1, in which the temperature is maintained between 5° and 35°C.

* * * * *